US009745958B2

(12) United States Patent
Agarwal et al.

(10) Patent No.: US 9,745,958 B2
(45) Date of Patent: Aug. 29, 2017

(54) METHOD AND SYSTEM FOR MANAGING LOADS ON A WIND TURBINE (71) Applicant: General Electric Company, Schenectady, NY (US)

(72) Inventors: Pranav Agarwal, Guilderland, NY (US); Charudatta Subhash Mehendale, Niskayuna, NY (US); Christopher Ryan Holsonback, Canterbury (NZ)

(73) Assignee: General Electric Company, Niskayuna, NY (US)

( * ) Notice: Subject to any disclaimer, the term of this patent is extended or adjusted under 35 U.S.C. 154(b) by 435 days.

(21) Appl. No.: 14/319,904

(22) Filed: Jun. 30, 2014

(65) Prior Publication Data
US 2015/0377215 A1 Dec. 31, 2015

(51) Int. Cl.
F03D 7/04 (2006.01)
F03D 7/02 (2006.01)

(52) U.S. Cl.
CPC ............ F03D 7/044 (2013.01); F03D 7/026 (2013.01); F03D 7/0212 (2013.01);
(Continued)

(58) Field of Classification Search
CPC ............ F05B 2270/32; F05B 2270/321; F05B 2270/322; F05B 2270/1095;
(Continued)

(56) References Cited

U.S. PATENT DOCUMENTS 4,193,005 A 3/1980 Kos et al.
4,565,929 A * 1/1986 Baskin .................. F03D 1/0658
174/DIG. 15
(Continued)

FOREIGN PATENT DOCUMENTS

WO 2010086688 8/2010

OTHER PUBLICATIONS

U.S. Appl. No. 13/718,387, filed Dec. 18, 2012, entitled Control System and Method for Mitigating Loads During Yaw Error on a Wind Turbine.
(Continued)

Primary Examiner — Gregory Anderson
Assistant Examiner — Eldon Brockman
(74) Attorney, Agent, or Firm — Nitin N. Joshi (57) ABSTRACT A method and a system for managing loads on a wind turbine are provided. The method includes receiving a signal relative to a yaw misalignment of the wind turbine, generating a yaw error signal based on the yaw misalignment, and comparing the yaw error signal to a first predetermined yaw error threshold value. The method also includes regulating a speed of the rotor to a value determined by a predetermined tip speed ratio, reducing the yaw misalignment using a yaw control system, and restarting the wind turbine if the yaw error signal is reduced to less than a second predetermined yaw error threshold value within a predetermined period of time. The method further includes shutting down the wind turbine if the yaw error signal remains greater than the second predetermined yaw error threshold value beyond the predetermined period of time.

20 Claims, 6 Drawing Sheets (52) U.S. Cl.
CPC ......... *F03D 7/0264* (2013.01); *F03D 7/0276* (2013.01); *Y02E 10/723* (2013.01)

(58) Field of Classification Search
CPC ........ F05B 2270/329; F05B 2270/1021; F05B 2270/1032; F05B 2270/107; F05B 2270/3201; F05B 2270/502; Y02E 10/723; Y02E 10/725; Y02E 10/726; G05B 15/02; F03D 7/044; F03D 7/0212; F03D 7/026; F03D 7/0264; F03D 7/0276; F03D 7/0268; F03D 7/04; F03D 7/042; F03D 7/043; F03D 7/045; F03D 7/046; F03D 7/0288; F03D 7/0292
See application file for complete search history.

(56) References Cited

U.S. PATENT DOCUMENTS

| | | | |
|---|---|---|---|
| 5,289,041 A * | 2/1994 | Holley | F03D 7/0224 290/44 |
| 7,175,389 B2 | 2/2007 | Moroz | |
| 7,445,431 B2 | 11/2008 | Larsen et al. | |
| 7,476,985 B2 | 1/2009 | Gonzalez | |
| 8,162,608 B2 | 4/2012 | Birkemose et al. | |
| 8,202,049 B2 | 6/2012 | Rogers et al. | |
| 8,239,071 B2 | 8/2012 | Lausen | |
| 8,317,471 B2 * | 11/2012 | Axelsson | F03D 7/0204 416/36 |
| 8,491,262 B2 | 7/2013 | McGrath et al. | |
| 2007/0116572 A1 | 5/2007 | Barbu et al. | |
| 2010/0068057 A1 | 3/2010 | Friedrich et al. | |
| 2012/0009062 A1 | 1/2012 | Ingram et al. | |
| 2012/0237346 A1 | 9/2012 | Mascarell et al. | |
| 2012/0257968 A1 | 10/2012 | Dalsgaard | |
| 2014/0050580 A1 * | 2/2014 | Hagen | F03D 7/0208 416/1 |

OTHER PUBLICATIONS

Muljadi, E. et al., "Pitch-Controlled Variable-Speed Wind Turbine Generation," 1999 IEEE Industry Application s Society Annual Meeting, Phoenix, Arizona, Oct. 2-7, 1999 (10 pgs).

Abo-Khalil, A.G. et al., "Dynamic Modeling and Control of Wind Turbines for Grid-Connected Wind Generation System," 37th IEEE Power Electronics Specialists Conference (PESC '06), Jun. 18-22, 2006, Jeju, Korea (6 pgs.).

* cited by examiner

METHOD AND SYSTEM FOR MANAGING LOADS ON A WIND TURBINE

BACKGROUND

Embodiments of the present disclosure are related to wind turbines, and more particularly to a system and method for controlling wind turbines.

Generally, a wind turbine includes a rotor having multiple blades. Wind turbines used to provide electrical power to a utility grid often have large rotors with blade diameters of 80 meters or more. Asymmetric loading across wind turbine rotor occurs due to vertical and horizontal wind shears, yaw misalignment, and turbulence. Vertical wind shear, yaw misalignment, and natural turbulence are among the primary drivers of asymmetric loads on a wind turbine rotor. These loads, along with the loads from vertical and/or horizontal wind shears, are contributors to extreme loads and the number of fatigue cycles accumulated by a wind turbine system.

Yaw misalignment can occur during turbulent wind periods when the wind shifts direction rapidly and maintains the new wind direction for a period of time. Static and cyclic loads induced in the wind turbine in this condition are a driving factor in the design of many of the wind turbine components. The components are necessarily designed to withstand the loads induced by extreme yaw misalignment. Making such robust components to be able to withstand those loads is expensive and operating components that suffer a reduced life span due to the cyclic nature of the loads is expensive and time-consuming.

During such load periods some known wind turbine systems attempt to counter the loading effects by manipulating a blade pitch control system or yaw control system to facilitate reducing loads if the misalignment is relatively small or short lived. Most wind turbine systems resort to shutting down the wind turbine if the yaw misalignment exceeds a threshold.

However, an uncontrolled shutdown of the wind turbine may present conditions, such as, but not limited to, overspeed of the rotor and extreme loads that can occur in a hub or a tower top, or blade flap moment.

BRIEF DESCRIPTION

In one embodiment, a computer-implemented method for managing loads on a wind turbine includes operating the wind turbine at a first power output level, receiving a signal representing a yaw misalignment of the wind turbine, the yaw misalignment defined as an angle between a direction of wind at the wind turbine and a longitudinal axis of the rotor. The method also includes generating a yaw error signal based on the yaw misalignment, comparing the yaw error signal to a first predetermined yaw error threshold value, and operating the wind turbine at a second power outlet level by regulating a speed of the rotor to a value determined by an optimal tip speed ratio (TSR) based on a measure of prevailing wind speeds wherein the TSR defined by dividing a tip speed of the blades by the prevailing wind speed. The method further includes reducing the yaw misalignment using a yaw control system and returning the wind turbine to operation at the first power output level if the yaw error signal is reduced to less than a second predetermined yaw error threshold value within a predetermined period of time wherein the second predetermined yaw error threshold value is less than the first predetermined yaw error threshold value. The method further includes shutting down the wind turbine if the yaw error signal remains greater than the second predetermined yaw error threshold value beyond the predetermined period of time.

In another embodiment, a turbine load management system is configured to manage loads on a wind turbine including a rotor having rotatable blades and coupled to an electrical generator through at least one rotor shaft. The turbine load management system includes a first sensor configured to generate a yaw misalignment signal relative to a yaw misalignment of the wind turbine. The yaw misalignment is defined as an angle between a direction of wind at the wind turbine and a longitudinal axis of a rotor of the wind turbine. The system further includes a yaw control system configured to adjust a yaw angle of the bladed rotor and a processor communicatively coupled to a memory device. The processor is programmed to receive the yaw misalignment signal, generate a yaw error signal based on the yaw misalignment, and compare the yaw error signal to a first predetermined yaw error threshold value. Based on the comparison, the processor is further programmed to regulate a speed of the rotor to a determined value, reduce the yaw misalignment using a yaw control system, and restart the wind turbine if the yaw error signal is reduced to less than a second predetermined yaw error threshold value within a predetermined period of time. The second predetermined yaw error threshold value is less than the first predetermined yaw error threshold value. The processor is also programmed to shut down the wind turbine if the yaw error signal remains greater than the second predetermined yaw error threshold value beyond the predetermined period of time.

In yet another embodiment, one or more non-transitory computer-readable storage media have computer-executable instructions embodied thereon that when executed by at least one processor cause the processor to receive a signal relative to a yaw misalignment of a wind turbine rotor. The yaw misalignment is defined as an angle between a direction of wind at the wind turbine and a longitudinal axis of the wind turbine rotor. The computer-executable instructions also cause the processor to generate a yaw error signal based on the yaw misalignment, and compare the yaw error signal to a first predetermined yaw error threshold value. Based on the comparison, the instructions further cause the processor to regulate a speed of the wind turbine rotor to a determined value, reduce the yaw misalignment using a yaw control system, and restart the wind turbine if the yaw error signal is reduced to less than a second predetermined yaw error threshold value within a predetermined period of time. The second predetermined yaw error threshold value is less than the first predetermined yaw error threshold value. The instructions also cause the processor to shut down the wind turbine if the yaw error signal remains greater than the second predetermined yaw error threshold value beyond the predetermined period of time.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems including one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As used herein, Tip Speed Ratio (TSR) refers to a ratio between the wind speed and the speed of the tips of the wind turbine blades.

$$TSR(\lambda) = \frac{\text{Tip Speed of Blade}}{\text{Wind Speed}}$$

If the rotor of the wind turbine spins too slowly, most of the wind will pass straight through the gap between the blades, therefore giving it no power. But if the rotor spins too fast, the blades will act like a solid wall to the wind. Also, rotor blades create turbulence as they spin through the air. If the next blade arrives too quickly, it will hit that turbulent air induced by the previous blade.

Embodiments of the present disclosure describe a system and method that defines a wind turbine response in presence of extreme yaw misalignment with and without the presence of extreme coherent gust. Such situations are defined as one of the extreme load cases for wind turbines. In some cases, the loads can be exacerbated by an immediate shutdown procedure initiation. Described herein is a procedure that may or may not lead to shutdown of the wind turbine depending on the response of the wind turbine to corrective commands but will result in mitigating these high loads throughout the period of this extreme disturbance. These extreme loads can occur during the transient created due to the presence of extreme yaw misalignment and extreme coherent gust, they can result due to large angle of attack variations during one cycle of rotor rotation which become larger with reduction of rotor speed resulting in higher loads at various multiples of rotor speed in fixed frame or they can also occur due to rapid pitching of blades towards feather resulting in a sudden change in aerodynamic thrust. The direction of pitching required to mitigate rotor imbalance loads is a function of several signals including rotor speed, direction of yaw misalignment, and mean wind speed. High loads during this scenario are design driving loads in tower top/hub loads and also blade loading. Embodiments of the present disclosure specify an operating procedure which results in systematic reduction in rotor imbalance loads in such scenarios.

In one embodiment, when the yaw error signal exceeds a first yaw error threshold, the maximum allowed counter torque level is ramped down to a first maximum allowed counter torque threshold in a first amount of time. Rotor speed is regulated using both the available counter torque, and pitch actuation to a first rotor speed setpoint that is calculated using TSR and an estimated wind speed in real-time. The first rotor speed setpoint bounded by an upper setpoint, which is lower than the rated speed of the wind turbine and a lower setpoint, which is higher than the cut-out rotor speed. Yaw error control is activated both to stabilize the turbine rotor speed in case of severe yaw misalignments and to minimize the yaw error once the maximum allowable counter torque is lower than the first maximum allowed counter torque threshold. Complete shutdown of the wind turbine is initiated when the yaw error is above a second yaw error threshold and the maximum allowable counter torque is above the first maximum allowed counter torque threshold, or the yaw error is higher than the second threshold for greater than a predetermined amount of time. Closed loop shutdown based on coordinated torque pitch control is executed to regulate a ramp down signal on rotor speed reference. Closed loop regulation of rotor speed is exited when the rotor speed is below the cut-out speed and the power convertor shuts off. At this point the blades are pitched towards feather at a predetermined rate.

The responsive operating procedure includes two distinct stages. The first stage is characterized by:

a. Stabilization of generator speed at a setpoint determined by incoming wind speed and optimal tip speed ratio (TSR) but limited below and above more tightly as compared to normal power production. The goal of the first stage is not to shutdown the turbine but operate it at a generator speed that can be regulated by collective usage of counter torque, pitch actuator, and yaw in that order of priority. The tighter limits are to prevent the turbine from shutting down due to rotor overspeed or due to rotor speed falling below a certain cut out speed.

b. Closed loop control on generator speed. Closed loop control uses counter torque, pitch actuation and yaw in a coordinated fashion to regulate/track generator speed. It prioritizes counter torque over pitch actuation to regulate generator speed. In situations where both counter torque and pitch are unable to maintain the required generator speed, yaw drive is activated immediately to minimize yaw misalignment and thereby increase the thrust and therefore the aerodynamic torque. Thus the control loop will automatically use all the available torque or pull back all the counter torque first to regulate generator speed. Only when it is not able to regulate the rotor speed with torque adjustment will the control start moving pitch actuation either towards power or feather. This helps in faster response to speed regulation in cases where normal mean wind speed drops due to sudden extreme yaw misalignment. It also reduces the usage of pitch actuators to respond to wind fluctuation. In case both the counter torque and the pitch actuator are saturated, it will engage the yaw drive to minimize yaw misalignment.

Another aspect of the first stage is to prepare the wind turbine to shut down during the second stage of operation if after a time delay, the yaw control system has not corrected the yaw misalignment. Preparing the wind turbine for a shutdown involves two steps, ramping down the maximum counter torque to a predetermined low pre-defined value and minimizing yaw misalignment by engaging the yaw drive.

The second stage includes shutting down the turbine, after minimization of yaw misalignment below a determined threshold and maximum counter torque limit set at below a certain threshold or if yaw misalignment is not lower than a certain threshold within a certain period of time, by ramping down the rotor speed reference and performing a closed loop shutdown using a coordinated torque-pitch control architecture.

Figure 1:
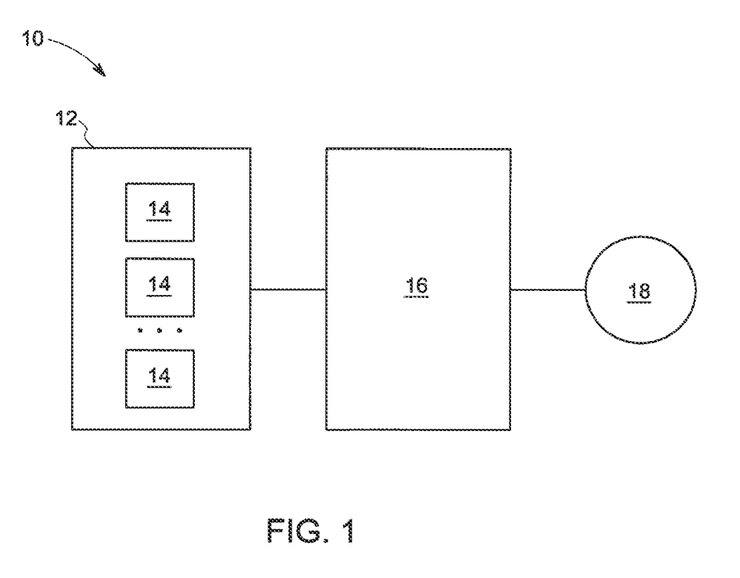
FIG. 1 is a block diagram of an exemplary power generation system that includes a power generator.

FIG. 1 is a block diagram of an exemplary power generation system 10 that includes a power generator 12. Power generator 12 includes one or more power generation units 14. Power generation units 14 may include, for example, wind turbines, solar cells, fuel cells, geothermal generators, hydropower generators, and/or other devices that generate power from renewable and/or non-renewable energy sources. Although three power generation units 14 are shown in the exemplary embodiment, in other embodiments, power generator 12 may include any suitable number of power generation units 14, including only one power generation unit 14.

In the exemplary embodiment, internally, power generator 12 includes an electrical generator 34 (shown in FIG. 3) that is coupled to a power converter 16. Power converter 16 is configured to convert a substantially direct current (DC) power output from electrical generator 34 to alternating current (AC) power. The AC power is transmitted to an electrical distribution network 18, or "grid." Power converter 16, in the exemplary embodiment, adjusts an amplitude of the voltage and/or current of the converted AC power to an amplitude suitable for electrical distribution network 18, and provides AC power at a frequency and a phase that are substantially equal to the frequency and phase of electrical distribution network 18. Moreover, in the exemplary embodiment, power converter 16 is configured to provide three phase AC power to electrical distribution network 18. Alternatively, power converter 16 can provide single phase AC power or any other number of phases of AC power to electrical distribution network 18. Furthermore, in some embodiments, power generation system 10 may include more than one power converter 16. For example, in some embodiments, each power generation unit 14 may be coupled to a separate power converter 16.

In the exemplary embodiment, power generation units 14 include one or more wind turbines 20 (shown in FIG. 3) coupled to facilitate operating power generation system 10 at a desired power output. Each wind turbine 20 includes electrical generator 34 (shown in FIG. 2) that is configured to generate substantially DC power, which is converted to AC power in power converter 16 and is then transmitted to the electrical distribution network 18. Methods and systems will be further described herein with reference to such a wind turbine based power generation system. However, the methods and systems described herein are applicable to any type of electric generation system.

Figure 2:
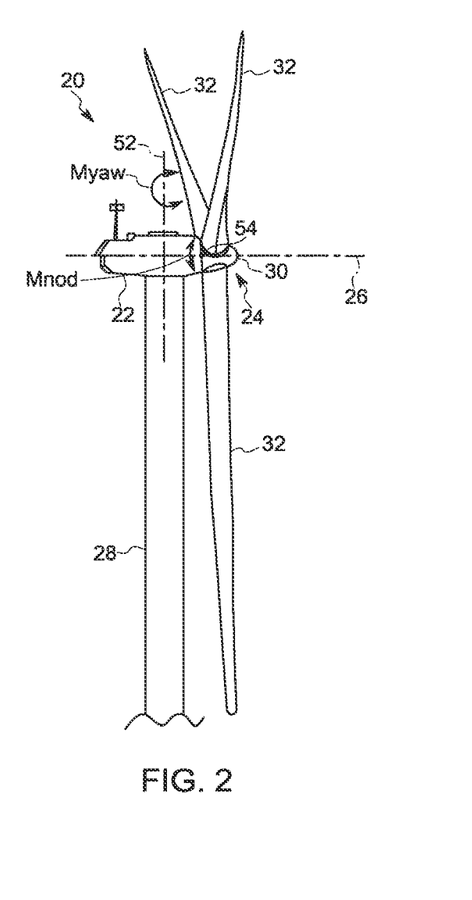
FIG. 2 is a perspective view of a wind turbine that may be used in the power generation system shown in FIG. 1.
Figure 3:
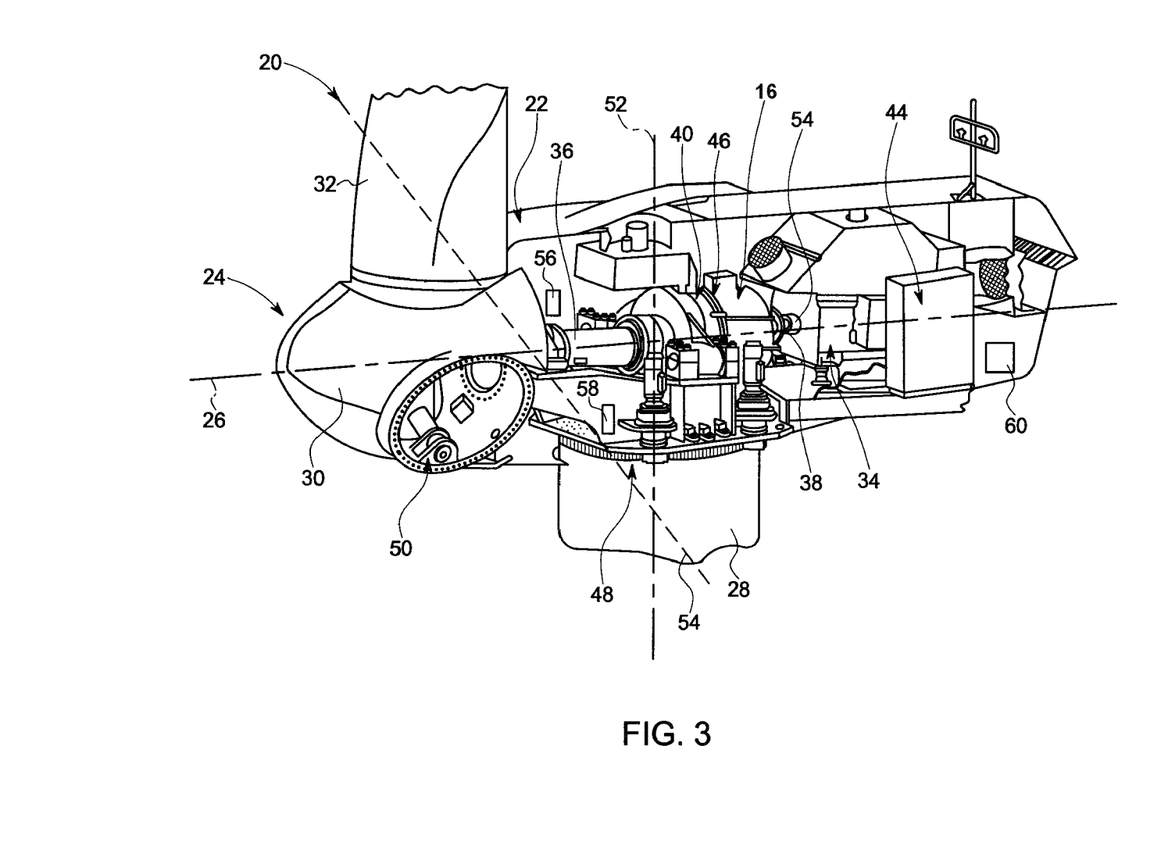
FIG. 3 is a partially cut-away perspective view of a portion of the wind turbine shown in FIG. 2.

FIG. 2 is a perspective view of wind turbine 20 (e.g., a horizontal axis wind turbine including a rotor 24 configured to rotate about a horizontal longitudinal axis 26) that may be used in power generation system 10. FIG. 3 is a partially cut-away perspective view of a portion of wind turbine 20. Wind turbine 20 described and shown herein is a wind turbine generator for generating electrical power from wind energy. Moreover, wind turbine 20 described and illustrated herein includes a horizontal-axis configuration. However, in some embodiments, wind turbine 20 may include, in addition or alternative to the horizontal-axis configuration, a vertical-axis configuration (not shown). Wind turbine 20 may be coupled to electrical distribution network 18 (shown in FIG. 1), for receiving electrical power therefrom to drive operation of wind turbine 20 and/or its associated components and/or for supplying electrical power generated by wind turbine 20 thereto. Although only one wind turbine 20 is shown in FIGS. 2 and 3, in some embodiments, a plurality of wind turbines 20 may be grouped together, sometimes referred to as a "wind farm."

Wind turbine 20 includes a body or nacelle 22 and a rotor (generally designated by 24) coupled to nacelle 22 for rotation with respect to nacelle 22 about a yaw axis of rotation 52. A yaw moment, $M_{yaw}$ acts about yaw axis of rotation 52 to tend to rotate nacelle 22 back-and-forth about yaw axis of rotation 52. A nodding moment, $M_{nod}$ acts about nodding axis 54 to tend to rotate nacelle 22 or a hub 30 about nodding axis 54, for example, in cases of a vertical wind gradient that exerts unequal force on blades 32 during an upper arc of their rotation as compared to a lower arc of their rotation about axis 26. One or more proximity sensors 56 are positioned within nacelle 22 to measure nodding moment $M_{nod}$ and one or more proximity sensors 58 are positioned within nacelle 22 to measure yaw moment $M_{yaw}$ In the exemplary embodiment, nacelle 22 is mounted on a tower 28. However, in some embodiments, in addition or alternative to tower-mounted nacelle 22, nacelle 22 may be positioned adjacent the ground (not shown) and/or a surface of water (not shown). The height of tower 28 may be any suitable height enabling wind turbine 20 to function as described herein. Rotor 24 includes a hub 30 and a plurality of blades 32 (sometimes referred to as "airfoils") extending radially outwardly from hub 30 for converting wind energy into rotational energy. Although rotor 24 is described and illustrated herein as having three blades 32, rotor 24 may have any number of blades 32. Blades 32 may each have any length that allows wind turbine 20 to function as described herein. For example, in some embodiments, one or more rotor blades 32 are about one-half meter long, while in some embodiments one or more rotor blades 32 are about fifty meters long. Other examples of blade lengths include ten meters or less, about twenty meters, about thirty-seven meters, and about forty meters. Still other examples include rotor blades between about fifty and about one-hundred meters long, and rotor blades greater than one-hundred meters long.

Wind turbine 20 includes an electrical generator 34 coupled to rotor 24 for generating electrical power from the rotational energy generated by rotor 24. Generator 34 may be any suitable type of electrical generator, such as, but not limited to, a wound rotor induction generator, a double-fed induction generator (DFIG, also known as a dual-fed asynchronous generator), a permanent magnet (PM) synchronous generator, an electrically-excited synchronous generator, and a switched reluctance generator. Generator 34 includes a generator stator (not shown in FIG. 2 or 3) and a generator rotor (not shown in FIG. 2 or 3) with an air gap included therebetween. Rotor 24 includes a rotor shaft 36 coupled to rotor hub 30 for rotation therewith. Generator 34 is coupled to rotor shaft 36 such that rotation of rotor shaft 36 drives rotation of the generator rotor, and therefore operation of generator 34. In the exemplary embodiment, generator 34 includes a generator shaft 38 coupled thereto and coupled to rotor shaft 36 such that rotation of rotor shaft 36 drives rotation of the generator rotor. In other embodiments, the generator rotor is directly coupled to rotor shaft 36, sometimes referred to as a "direct-drive wind turbine." In the exemplary embodiment, generator shaft 38 is coupled to rotor shaft 36 through a gearbox 40, although in other embodiments generator shaft 38 is coupled directly to rotor shaft 36.

The mechanical torque applied to rotor 24 by the wind-driven blades and hub drives the generator rotor to generate DC electrical power from the rotation of rotor 24. Generator 34 has an air gap torque, often referred to as counter-torque, between the generator rotor and generator stator that opposes the mechanical torque of rotor 24. Power converter 16 is coupled to generator 34 for converting the DC power to a fixed frequency AC power for delivery to an electrical load (not shown), such as, but not limited to electrical distribution network 18 (shown in FIG. 1), coupled to generator 34. In some embodiments, generator 34 may generate a variable frequency AC power that subsequently is converted to a fixed frequency AC power. Power converter 16 may include a single frequency converter or a plurality of frequency converters configured to convert electricity generated by generator 34 to electricity suitable for delivery over the power grid. Power converter 16 may also be referred to herein as a power converter. Power converter 16 may be located anywhere within or remote to wind turbine 20. For example, power converter 16 may be located within a base (not shown) of tower 28.

In the exemplary embodiment, wind turbine 20 includes at least one system controller 44 coupled to at least one component of wind turbine 20 for generally controlling operation of wind turbine 20 and/or controlling operation of the components thereof. For example, system controller 44 may be configured to control operation of power converter 16, a disk brake 46, a yaw control system 48, and/or a variable blade pitch control system 50. Disk brake 46 brakes rotation of rotor 24 to, for example, slow rotation of rotor 24, brake rotor 24 against full wind torque, and/or reduce the generation of electrical power from electrical generator 34. Yaw control system 48 rotates nacelle 22 about yaw axis of rotation 52 for changing a yaw of rotor 24, and more specifically for changing a direction faced by rotor 24 to, for example, adjust an angle between the direction faced by rotor 24 and a direction of wind. Other sensors 60 are communicatively coupled to system controller for use in communicating such parameter values that are sensed by other sensors 60. For example, other sensors include electrical parameter measurement sensors, such as, a power output level sensor 62 configured to sense real and reactive power output of generator 34.

Furthermore, variable blade pitch control system 50 controls, including but not limited to changing, a pitch angle of blades 32 (shown in FIGS. 2-3) with respect to a wind direction. Pitch control system 50 may be coupled to system controller 44 for control thereby. Pitch control system 50 is coupled to hub 30 and blades 32 for changing the pitch angle of blades 32 by rotating blades 32 with respect to hub 30. Pitch control system 50 may include any suitable structure, configuration, arrangement, means, and/or components, whether described and/or shown herein, such as, but not limited to, electrical motors, hydraulic cylinders, springs, and/or servomechanisms. Moreover, pitch control system 50 may be driven by any suitable means, whether described and/or shown herein, such as, but not limited to, hydraulic fluid, electrical power, electro-chemical power, and/or mechanical power, such as, but not limited to, spring force.

Figure 4:
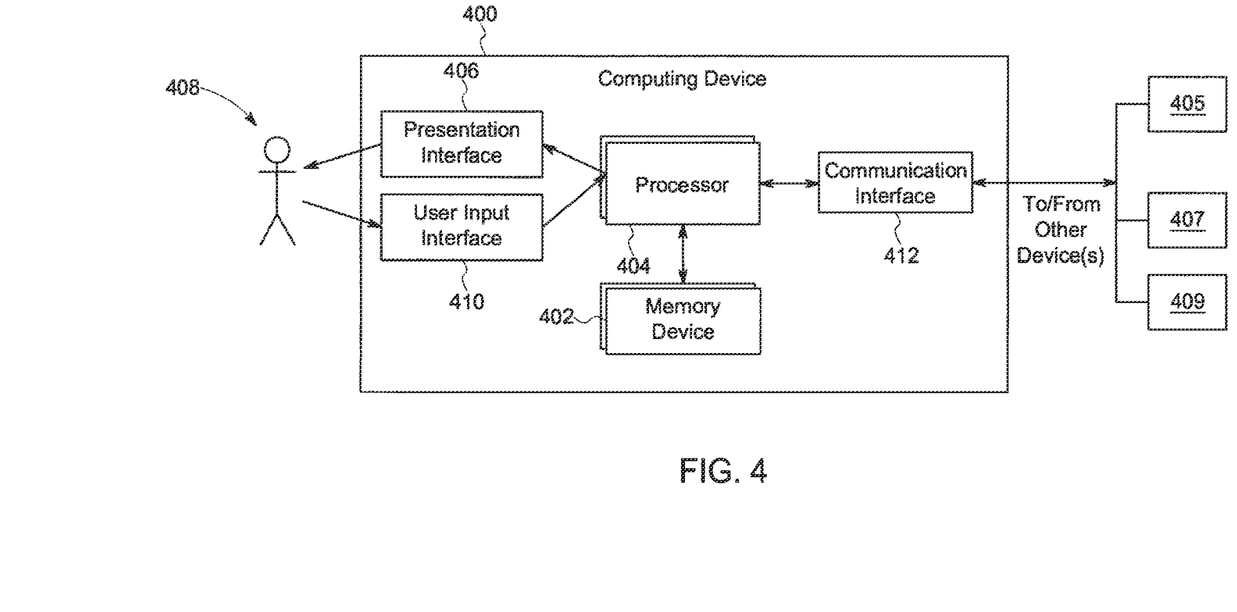
FIG. 4 is a block diagram of an exemplary computing device that may be used to monitor and/or control the operation of the wind turbine shown in FIGS. 2 and 3.

FIG. 4 is a block diagram of an exemplary computing device 400 that may be used to monitor and/or control the operation of wind turbine 20 (shown in FIGS. 2 and 3). Computing device 400 includes a memory device 402 and a processor 404 operatively coupled to memory device 402 for executing instructions. As used herein, the term "processor" includes any suitable programmable circuit such as, without limitation, one or more systems and microcontrollers, microprocessors, a general purpose central processing unit (CPU), reduced instruction set circuits (RISC), application specific integrated circuits (ASIC), programmable logic circuits (PLC), field programmable gate arrays (FPGA), and/or any other circuit capable of executing the functions described herein. The above examples are exemplary only, and thus are not intended to limit in any way the definition and/or meaning of the term "processor."

Processor 404 may include one or more processing units (e.g., in a multi-core configuration). In some embodiments, executable instructions are stored in memory device 402. Computing device 400 is configurable to perform one or more operations described herein by programming processor 404. For example, processor 404 may be programmed by encoding an operation as one or more executable instructions and providing the executable instructions in memory device 402.

In addition, in the exemplary embodiment, memory device 402 is at least one device coupled to processor 404 that enables storage and retrieval of information such as computer-executable instructions and data, including, without limitation, operating data, parameters, setpoints, threshold values, and/or any other data that enables computing device 400 to function as described herein. Memory device 402 may include one or more tangible, non-transitory, computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Memory device 402 may be configured to store operational measurements including, without limitation, utility electric power grid voltage and current readings, substation voltage and current readings, localized voltage and current readings throughout wind turbine 20, including an auxiliary electric power system 405 and an electric power generation system 407, and/or any other type of data. In some embodiments, processor 404 removes or "purges" data from memory device 402 based on the age of the data. For example, processor 404 may overwrite previously recorded and stored data associated with a subsequent time and/or event. In addition, or alternatively, processor 404 may remove data that exceeds a predetermined time interval. Also, memory device 402 includes, without limitation, sufficient data, algorithms, and commands to facilitate centralized and distributed control of protection and control system 409 of electrical distribution network 18.

In some embodiments, computing device 400 includes a presentation interface 406 coupled to processor 404. Presentation interface 406 presents information, such as a user interface and/or an alarm, to a user 408. In one embodiment, presentation interface 406 includes a display adapter (not shown) that is coupled to a display device (not shown), such as a cathode ray tube (CRT), a liquid crystal display (LCD), an organic LED (OLED) display, and/or an "electronic ink" display. In some embodiments, presentation interface 406 includes one or more display devices. In addition, or alternatively, presentation interface 406 includes an audio output device (not shown) (e.g., an audio adapter and/or a speaker) and/or a printer (not shown). In some embodiments, presentation interface 406 presents an alarm associated with a synchronous machine (not shown in FIG. 1), such as by using a human machine interface (HMI) (not shown).

In some embodiments, computing device 400 includes a user input interface 410. In the exemplary embodiment, user input interface 410 is coupled to processor 404 and receives input from user 408. User input interface 410 may include, for example, a keyboard, a pointing device, a mouse, a stylus, a touch sensitive panel (e.g., a touch pad or a touch screen), and/or an audio input interface (e.g., including a microphone). A single component, such as a touch screen, may function as both a display device of presentation interface 406 and user input interface 410.

A communication interface 412 is coupled to processor 404 and is configured to be coupled in communication with one or more other devices, such as a sensor or another computing device 400, and to perform input and output operations with respect to such devices. For example, communication interface 412 may include, without limitation, a wired network adapter, a wireless network adapter, a mobile telecommunications adapter, a serial communication adapter, and/or a parallel communication adapter. Communication interface 412 may receive data from and/or transmit data to one or more remote devices. For example, a communication interface 412 of one computing device 400 may transmit an alarm to the communication interface 412 of another computing device 400.

Presentation interface 406 and/or communication interface 412 are both capable of providing information suitable for use with the methods described herein (e.g., to user 408 or another device). Accordingly, presentation interface 406 and communication interface 412 may be referred to as output devices. Similarly, user input interface 410 and communication interface 412 are capable of receiving information suitable for use with the methods described herein and may be referred to as input devices.

Figure 5:
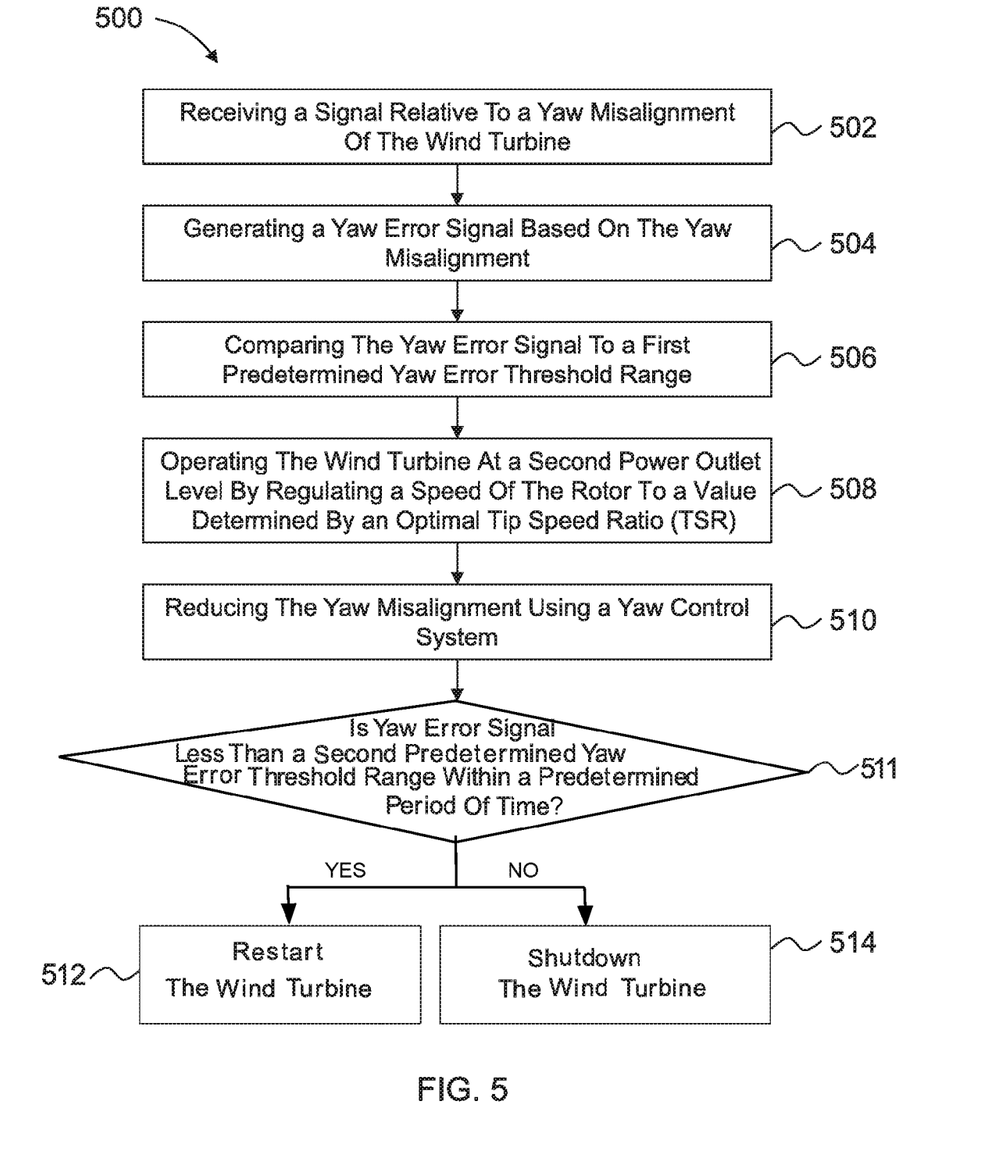
FIG. 5 is a flow diagram of a computer-implemented method for managing loads on wind turbine shown in FIG. 2.

FIG. 5 is a flow diagram of a computer-implemented method 500 for managing loads on wind turbine 20 (shown in FIG. 2). Wind turbine 20 includes rotor 24 having rotatable blades 32 and coupled to electrical generator 34 through at least one shaft 36, 38. In the exemplary embodiment, method 500 is implemented using processor 404 (shown in FIG. 4) coupled to memory device 402 (shown in FIG. 4). Method 500 includes operating the wind turbine at a first output power level and receiving 502 a signal relative to a yaw misalignment of wind turbine 20. As used herein, the yaw misalignment is defined as an angle between a direction of wind at wind turbine 20 and a longitudinal axis of rotor 24. Also as used herein, a power output level refers to a range of power output to which the wind turbine is controlled. For example, a wind turbine operating at a full power output level may by controlled over a range of 80% to 100% of the wind turbine capability. Similarly, a wind turbine operating at a medium power output level may by controlled over a range of 40% to 80% of the wind turbine capability and a wind turbine operating at an idle power output level may be controlled over a range of 10% to 40% of the wind turbine capability. Rather, than specifying an absolute power level value, each wind turbine power output level broadly refers to a range of wind turbine operation. Method 500 also includes generating 504 a yaw error signal based on the yaw misalignment, and comparing 506 the yaw error signal to a first predetermined yaw error threshold value. For example, if, because of a change in wind direction, the yaw error quickly exceeded a predetermined amount, such as, but not limited to forty-five degrees, the yaw error could be recognized as an extreme yaw misalignment that required a relatively fast response to lower potential loading on wind turbine 20.

Based on the comparison, method 500 also includes, operating wind turbine 20 if the yaw error signal is larger than the first predetermined yaw error threshold value by a predetermined amount for a predetermined period of time. Such operating includes, for example, regulating 508 a speed of rotor 24 (shown in FIG. 3), for example, to a value determined by a tip speed ratio (TSR) wherein the TSR defined by dividing a tip speed of blades 32 (shown in FIG. 2) by the incoming wind speed and reducing 510 the yaw misalignment using yaw control system 48. During the operating, the speed of rotor 24 is regulated by collective usage of, in an order of priority, a counter torque on rotor 24, blade pitch control system 50, and yaw control system 48. Regulating the speed of rotor 24 using a counter torque on rotor 24 includes regulating an electrical load on wind turbine 20 and/or ramping a maximum counter torque limit down to a predetermined low value. Method 500 includes determining 511 whether the yaw error signal is reduced to less than a second predetermined yaw error threshold value within a predetermined period of time. Method 500 further includes restarting 512 wind turbine 20 if the yaw error signal is reduced to less than a second predetermined yaw error threshold value within a predetermined period of time, the second predetermined yaw error threshold value being less than the first predetermined yaw error threshold value. As used herein, restarting refers to returning the wind turbine to a previous output power level. In various embodiments, the second predetermined yaw error threshold value is approximately fifteen degrees and the predetermined time period is approximately 180 seconds. As described above, if the yaw error exceeds forty-five degrees, yaw control system 48 will be given 180 seconds to correct the yaw misalignment to less than fifteen degrees. If yaw control system 48 does correct the yaw misalignment within the 180 second time period, wind turbine 20 will not enter a shutdown mode, but rather will maintain itself ready to restart or will automatically restart. In the exemplary embodiment, restarting wind turbine 20 includes increasing a speed of rotor 24 using a rotor speed reference and increasing an electrical load of wind turbine 20.

Method 500 includes, if yaw control system 48 is unable to correct the yaw misalignment with the 180 second time period, shutting down 514 wind turbine 20 wherein shutting down 514 optionally includes ramping down a rotor speed reference and completing a closed loop shutdown using coordinated torque-pitch control. Shutting down wind turbine 20 further includes minimizing yaw misalignment using yaw control system 48.

Figure 6:
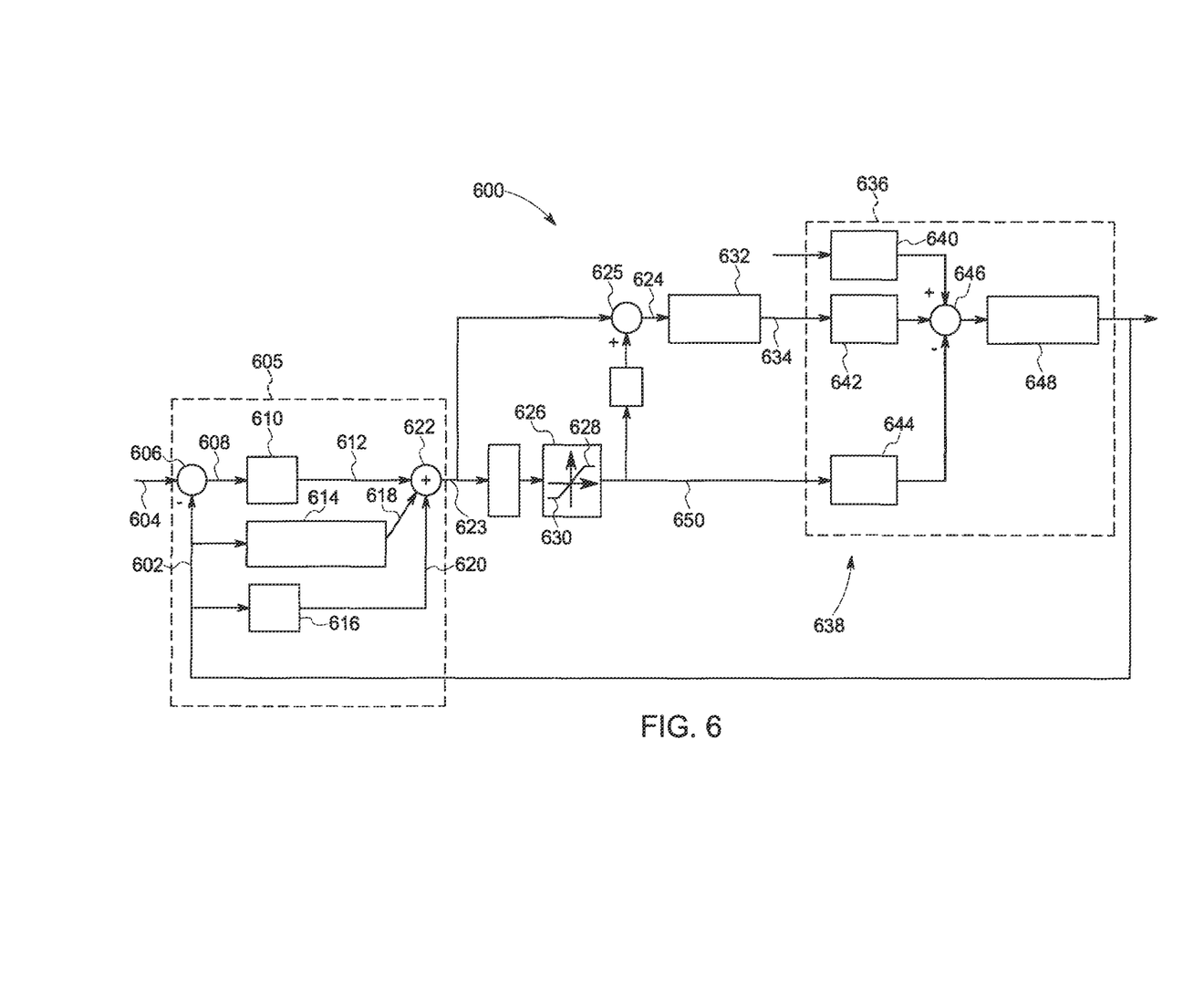
FIG. 6 is a data flow diagram of a coordinated wind turbine torque and pitch control system that is used with wind turbine shown in FIG. 1.

FIG. 6 is a data flow diagram of a coordinated wind turbine torque and pitch control system 600 that is used with wind turbine 20 (shown in FIG. 1). In the exemplary embodiment, coordinated wind turbine torque and pitch control system 600 forms a portion of system controller 44 (shown in FIG. 3). In other embodiments, coordinated wind turbine torque and pitch control system 600 is a stand-alone system separate from coordinated wind turbine torque and pitch control system 600. Coordinated wind turbine torque and pitch control system 600 may directly communicate with system controller 44 or may communicate indirectly with system controller 44 to accomplish the functions described herein.

In the exemplary embodiment, a rotor speed signal 602 and a rotor speed reference signal 604 are input into a controller 605, such as, but not limited to a proportional-integral-derivative (PID) controller that includes several components 610, 614, 616. Rotor speed signal 602 and rotor speed reference signal 604 are compared in a summing junction 606, which generates a rotor speed error signal 608. Rotor speed error signal 608 is directed to proportional-integral-derivative (PID) controller component 610, rotor speed signal 602 is directed to PID controller components 614 and 616. Outputs of PID controller components 610, 614, and 616 along lines 612, 618, 620, respectively, are combined in summing junction 622, which generates a torque error signal 623 that represents a required amount of change in the aerodynamic torque to regulate the rotor speed.

Controller 605 is configured to determine a final pitch command 634 and a final torque command 650 required to mitigate rotor speed error signal 608. The net reduction in aerodynamic torque required to regulate rotor speed is given by torque error signal 623. This reduction can be achieved either through modifying generator counter torque or by pitching the blades. First, ignoring a pitch control contribution to controlling rotor speed, an amount of torque that is required to regulate rotor speed is determined. If final torque command 650 is sufficient, in the sense that it can be provided by the converter, final pitch command 634 is not needed to regulate rotor speed and a limit function block 626 is used to impose converter limits on final torque command 650 by determining a maximum torque limit 628 and a minimum torque limit 630. By using final torque command 650 to manage rotor speed using the torque available from the converter to the maximum extent possible before using final pitch command 634 to manage rotor speed using blade pitch, blade pitch control is available to manage loads on wind turbine 20 arising through aerodynamic torque and aerodynamic thrust.

Torque error signal 623, which represents the required amount of change in the aerodynamic torque to regulate the rotor speed and final torque command 650 are combined at summing junction 625 to generate a required pitch signal 624, which represents the residual amount of aerodynamic torque that cannot be managed by changes in generator counter torque. This residual is managed by pitching the blades. A pitch contribution block 632 determines an amount of final pitch command 634 that is required to assist the torque contribution for controlling rotor speed. If the required torque is within a range of maximum torque limit 628 and a minimum torque limit 630, then pitch contribution block 632, will generate a zero contribution, so a current pitch of blades 32 will stay wherever it is. But, if rotor speed error signal 608 is large, such that torque error signal 623 saturates on the converter limits, maximum torque limit 628 and a minimum torque limit 630 and there is still additional torque error signal 623, final pitch command 634 will be other than zero and the pitch of blades 32 will be commanded to feather or power as required to assist the converter torque in maintaining rotor speed. This scheme represents a prioritized control architecture where torque has a higher priority than pitch for controlling the speed of rotor 24.

An open loop model 636 is used to determine rotor speed signal 602 by implementing a linearized form of the non-linear dynamic equation of rotor acceleration:

$$J_R \dot{\omega}_r = M_z \text{Aero}(\omega_r, \theta, v) - NT_{gen}, \text{ where}$$

$\dot{\omega}_r$ represents an acceleration of rotor 24, $M_z\text{Aero}(\omega_r, \theta, v)$ represents the aerodynamic torque, and $NT_{gen}$ represents the counter-torque provided by electrical generator 34.

If the difference between the aerodynamic torque and the counter-torque provided by electrical generator 34 is positive, rotor 24 will accelerate. If the difference is negative, rotor 24 will decelerate. The aerodynamic torque is dependent on the wind velocity, v, rotor speed, $\omega_r$, and pitch angle, $\theta$. In steady state, where rotor acceleration, $\dot{\omega}_r$ is zero, the aerodynamic torque, $M_z\text{Aero}(\omega_r, \theta, v)$ will be approximately equal to the counter-torque, $NT_{gen}$.

Open loop model 636 includes three partial equations 638 with respect to wind velocity, v 640, pitch angle, $\theta$ 642, and generator counter-torque 644. Partial equations 638 are combined at a summing junction 646. Rotor speed, $\omega_r$, 648 automatically is determined as a first order dynamic.

In a case where wind speed is a relatively high magnitude, aerodynamic torque may be at a magnitude that is greater than a desired operating point. If, for example, the maximum counter-torque that generator 34 is able to provide is 25% of its rated capacity, then the system will use the available counter-torque before using pitch control system 50 to automatically pitch blades 32 towards feather to bring the aerodynamic torque to the same 25% of its rated capacity.

The above-described embodiments of a method and system of managing loads in a wind turbine provides a cost-effective and reliable means for determining when loads which may cause damage to the wind turbine are present and operating the wind turbine to stabilize its operation. The embodiments described herein use a prioritized operating process that uses several load mitigating systems already in place on the wind turbine. Specifically, the embodiments described herein use the counter-torque of the generator to regulate the speed of rotor 24 if there is sufficient capacity. If there is not sufficient counter-torque capacity to regulate rotor speed to the determined value, pitch control is used in additional to the counter-torque available to regulate rotor speed. Therefore, the embodiments described herein facilitate reducing loads of the wind turbine while maintaining the wind turbine online and ready to resume power generation rather than being shutdown, thereby improving the capacity factor and revenue generation of the wind turbine.

An exemplary technical effect of the methods, systems, and apparatus described herein includes at least one of: (a) providing a systematic process way of reducing rotor imbalance loads on the wind turbine in presence of extreme yaw misalignment such that all the practical turbine operational constraints are preserved and the wind turbine is maintained in a ready state for as long as possible to permit wind turbine systems to reduce the imbalance loads of rotor 24; (b) coordinating the use of counter-torque, pitch, and yaw drive to facilitate reducing the imbalance loads of rotor 24; and (c) preserving the possibility to recover the turbine back to loads operation.

Exemplary embodiments of methods, systems, and apparatus for activating a wind turbine rotor imbalance control subsystem are not limited to the specific embodiments described herein, but rather, components of systems and/or steps of the methods may be utilized independently and separately from other components and/or steps described herein. For example, the methods may also be used in combination with other systems requiring alternate activation systems and the associated methods, and are not limited to practice with only wind turbine 20 monitoring and control systems and methods as described herein. Rather, the exemplary embodiment can be implemented and utilized in connection with many other applications, equipment, and systems that may benefit from alternate activation methods of control systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for managing loads on a wind turbine including a rotor having rotatable blades and coupled to an electrical generator through at least one rotor shaft, the method implemented using one or more processors coupled to one or more memory devices, the method comprising:

operating the wind turbine at a first power output level;

receiving a signal representing a yaw misalignment of the wind turbine, the yaw misalignment defined as an angle between a direction of wind at the wind turbine and a longitudinal axis of the rotor;

generating a yaw error signal based on the yaw misalignment;

comparing the yaw error signal to a first predetermined yaw error threshold value;

operating the wind turbine at a second power outlet level if the yaw error signal is greater than the first predetermined yaw error threshold value by regulating a speed of the rotor to a value determined by an optimal tip speed ratio (TSR) based on a measure of prevailing wind speeds, the TSR defined by dividing a tip speed of the blades by the prevailing wind speed;

reducing the yaw misalignment using a yaw control system if the yaw error signal is greater than the first predetermined yaw error threshold value;

returning the wind turbine to operation at the first power output level if the yaw error signal is reduced to less than a second predetermined yaw error threshold value within a predetermined period of time, the second predetermined yaw error threshold value being less than the first predetermined yaw error threshold value; and shutting down the wind turbine if the yaw error signal remains greater than the second predetermined yaw error threshold value beyond the predetermined period of time.

2. The method of claim 1, further comprising regulating the speed of the rotor between an upper setpoint, which is lower than the rated speed of the wind turbine and a lower setpoint, which is higher than the cut-out rotor speed by using one of a counter torque on the rotor, a blade pitch control system, and the yaw control system.

3. The method of claim 2, wherein regulating the speed of the rotor using a counter torque on the rotor comprises regulating an electrical load on the wind turbine.

4. The method of claim 2, wherein regulating the speed of the rotor using a counter torque on the rotor comprises ramping a maximum counter torque limit down to a predetermined low value.

5. The method of claim 1, wherein shutting down the wind turbine further comprises:
ramping down a rotor speed reference; and
completing a closed loop shutdown using coordinated torque-pitch control.

6. The method of claim 1, wherein shutting down the wind turbine further comprises minimizing yaw misalignment using the yaw control system.

7. The method of claim 1, wherein returning the wind turbine to operation at the first power output level comprises increasing a speed of the rotor using a rotor speed reference.

8. The method of claim 1, wherein returning the wind turbine to operation at the first power output level comprises increasing an electrical load of the wind turbine.

9. A load management system configured to manage loads on a wind turbine operating at a first power output level, the wind turbine including a rotor having rotatable blades and coupled to an electrical generator through at least one rotor shaft, said load management system comprising:

a first sensor configured to generate a yaw misalignment signal relative to a yaw misalignment of the wind turbine, the yaw misalignment defined as an angle between a direction of wind at the wind turbine and a longitudinal axis of a rotor of the wind turbine;

a yaw control system configured to adjust a yaw angle of the bladed rotor;

one or more processors communicatively coupled to one or more memory devices, the processor programmed to:
receive the yaw misalignment signal;
generate a yaw error signal based on the yaw misalignment;
compare the yaw error signal to a first predetermined yaw error threshold value;
operate the wind turbine at second power output level if the yaw error signal is greater than the first predetermined yaw error threshold value by regulating a speed of the rotor to a value determined in real-time by an optimal tip speed ratio (TSR) based on a measure of prevailing wind speeds, the TSR defined by dividing a tip speed of the blades by the prevailing wind speed;
reduce the yaw misalignment using a yaw control system if the yaw error signal is greater than the first predetermined yaw error threshold value;
return the wind turbine to the first power output level if the yaw error signal is reduced to less than a second predetermined yaw error threshold value within a predetermined period of time; and
shut down the wind turbine if the yaw error signal remains greater than the second predetermined yaw error threshold value beyond the predetermined period of time.

10. The system of claim 9, wherein said processor is further programmed to reduce a speed of the rotor to a value determined by a predetermined tip speed ratio (TSR), the TSR defined by dividing a tip speed of the blades by the incoming wind speed.

11. The system of claim 9, wherein said processor is further programmed to receive an indication of electrical load of the wind turbine.

12. The system of claim 9, wherein said processor is further programmed to regulate the speed of the rotor by using one of a counter torque on the rotor, a blade pitch control system, and the yaw control system.

13. The system of claim 9, wherein said processor is further programmed to regulate the speed of the rotor by regulating an electrical load on the wind turbine.

14. The system of claim 9, wherein said processor is further programmed to ramp a maximum counter torque limit down to a predetermined low value.

15. The system of claim 9, wherein said processor is further programmed to shut down the wind turbine by:
ramping down a rotor speed reference; and
completing a closed loop shutdown using coordinated torque-pitch control.

16. The system of claim 9, wherein said processor is further programmed to shut down the wind turbine by minimizing yaw misalignment using the yaw control system.

17. The system of claim 9, wherein said processor is further programmed to restart the wind turbine by increasing a speed of the rotor using a rotor speed reference.

18. The system of claim 9, wherein said processor is further programmed to restart the wind turbine by increasing an electrical load of the wind turbine.

19. One or more non-transitory computer-readable storage media having computer-executable instructions embodied thereon, wherein when executed by at least one processor, the computer-executable instructions cause the processor to:

receive a signal relative to a yaw misalignment of a wind turbine rotor during operation of the wind turbine at a first power output level, the yaw misalignment defined as an angle between a direction of wind at the wind turbine and a longitudinal axis of the wind turbine rotor;

generate a yaw error signal based on the yaw misalignment;

compare the yaw error signal to a first predetermined yaw error threshold value;

operate the wind turbine at a second power output level if the yaw error signal is greater than the first predetermined yaw error threshold value by regulating a speed of the rotor to a value determined in real-time by an optimal tip speed ratio (TSR) based on a measure of prevailing wind speeds, the TSR defined by dividing a tip speed of the blades by the prevailing wind speed;

reduce the yaw misalignment using a yaw control system if the yaw error signal is greater than the first predetermined yaw error threshold value;

returning the wind turbine to the first power output level if the yaw error signal is reduced to less than a second predetermined yaw error threshold value within a predetermined period of time, the second predetermined yaw error threshold value being less than the first predetermined yaw error threshold value; and shut down the wind turbine if the yaw error signal remains greater than the second predetermined yaw error threshold value beyond the predetermined period of time.

20. The computer-readable storage media of claim 19, wherein the computer-executable instructions further cause the processor to regulate the speed of the rotor by using one of a counter torque on the rotor, a blade pitch control system, and the yaw control system.

* * * * *